(12) United States Patent
Kuang et al.

(10) Patent No.: US 8,386,104 B2
(45) Date of Patent: Feb. 26, 2013

(54) SYSTEM AND METHOD FOR DISPLAYING POWER FLOW IN A HYBRID VEHICLE

(75) Inventors: Ming Lang Kuang, Canton, MI (US); Ryan Skaff, Farmington Hills, MI (US); Paul Stephen Bryan, Belleville, MI (US); Michael Lerman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 466 days.

(21) Appl. No.: 12/728,842

(22) Filed: Mar. 22, 2010

(65) Prior Publication Data

US 2010/0305795 A1  Dec. 2, 2010

Related U.S. Application Data

(60) Provisional application No. 61/182,800, filed on Jun. 1, 2009.

(51) Int. Cl.
*B60K 6/22* (2007.10)
*B60W 20/00* (2006.01)

(52) U.S. Cl. .......... 701/22; 340/438; 340/455; 903/904; 180/65.21

(58) Field of Classification Search ............ 701/22
See application file for complete search history.

(56) References Cited

U.S. PATENT DOCUMENTS

| | | | |
|---|---|---|---|
| 5,005,663 A | 4/1991 | Niide et al. | |
| 5,820,172 A | 10/1998 | Brigham et al. | |
| 6,114,775 A | 9/2000 | Chung et al. | |
| 6,424,157 B1 | 7/2002 | Gollomp et al. | |
| 6,522,148 B2 | 2/2003 | Ochiai et al. | |
| 6,621,247 B1 | 9/2003 | Bulling et al. | |
| 6,639,385 B2 | 10/2003 | Verbrugge et al. | |
| 6,932,174 B2 | 8/2005 | Hirata et al. | |
| 7,034,504 B2 | 4/2006 | Arai et al. | |
| 7,109,604 B2 | 9/2006 | Kablaoui et al. | |
| 7,268,442 B2 | 9/2007 | Syed et al. | |
| 7,285,869 B2 | 10/2007 | Syed et al. | |
| 7,398,147 B2 | 7/2008 | Kozarekar et al. | |
| 7,474,309 B2 * | 1/2009 | Kolpasky et al. | 345/440 |
| 8,058,982 B2 * | 11/2011 | Crowe et al. | 340/455 |
| 2004/0020695 A1 | 2/2004 | Potter | |
| 2004/0216636 A1 * | 11/2004 | Emori et al. | 105/26.05 |
| 2005/0278079 A1 | 12/2005 | Maguire | |
| 2007/0032926 A1 | 2/2007 | Kozarekar et al. | |
| 2007/0208468 A1 * | 9/2007 | Sankaran et al. | 701/29 |

(Continued)

FOREIGN PATENT DOCUMENTS

| | | |
|---|---|---|
| EP | 2033830 A2 | 3/2009 |
| JP | 09098501 A | 4/1997 |

(Continued)

OTHER PUBLICATIONS

International Search Report dated Mar. 7, 2005, 2 pp.

(Continued)

*Primary Examiner* — Shelley Chen
(74) *Attorney, Agent, or Firm* — David B. Kelley; Brooks Kushman P.C.

(57) ABSTRACT

A system and method is provided for determining a mode of operation of a hybrid vehicle, obtaining torque data and speed data based on the mode of operation, and displaying component icons as well as a graphical representation of power flows. The graphical representation of power flows is displayed between pairs of the component icons. The component icons represent components of the hybrid vehicle including an engine, a battery, drive wheels, and an electric machine arrangement.

27 Claims, 6 Drawing Sheets

U.S. PATENT DOCUMENTS

| | | | |
|---|---|---|---|
| 2008/0243325 A1 | 10/2008 | Kozarekar et al. | |
| 2010/0052888 A1* | 3/2010 | Crowe et al. | 340/461 |
| 2010/0057280 A1* | 3/2010 | Crowe et al. | 701/22 |
| 2010/0057281 A1* | 3/2010 | Lawyer et al. | 701/22 |
| 2012/0179313 A1* | 7/2012 | Hartl et al. | 701/22 |

FOREIGN PATENT DOCUMENTS

| | | | |
|---|---|---|---|
| JP | 09107601 A * | 4/1997 | |
| JP | 11208313 A | 8/1999 | |
| JP | 11220808 A | 8/1999 | |
| JP | 2000247164 A | 9/2000 | |
| JP | 2001034274 A | 2/2001 | |
| JP | 2001231109 A | 8/2001 | |
| JP | 2002247706 A * | 8/2002 | |
| JP | 2007050889 A * | 3/2007 | |

OTHER PUBLICATIONS

2009 GMC Hybrid Lineup: Yukon and Sierra Hybrids, http://www.imakenews.com/billmarshag/e_article001350323.cfm?x=b11,b5yt90KM,w, pp. 1-3.

Making Sense of The Displays, http://prius.ecrostech.com/original/Understanding/MakingSenseOfDisplays.htm, pp. 1-7.

New York 2009: Mercedes-Benz ML 450 Hybrid Can Go 34 mph on Batteries, http://www.autobloggreen.com/2009/04/08/new-york-2009-mercedes-benz-ml-450 hybrid-can-go-34-mph-on-batt/, pp. 1-11.

* cited by examiner

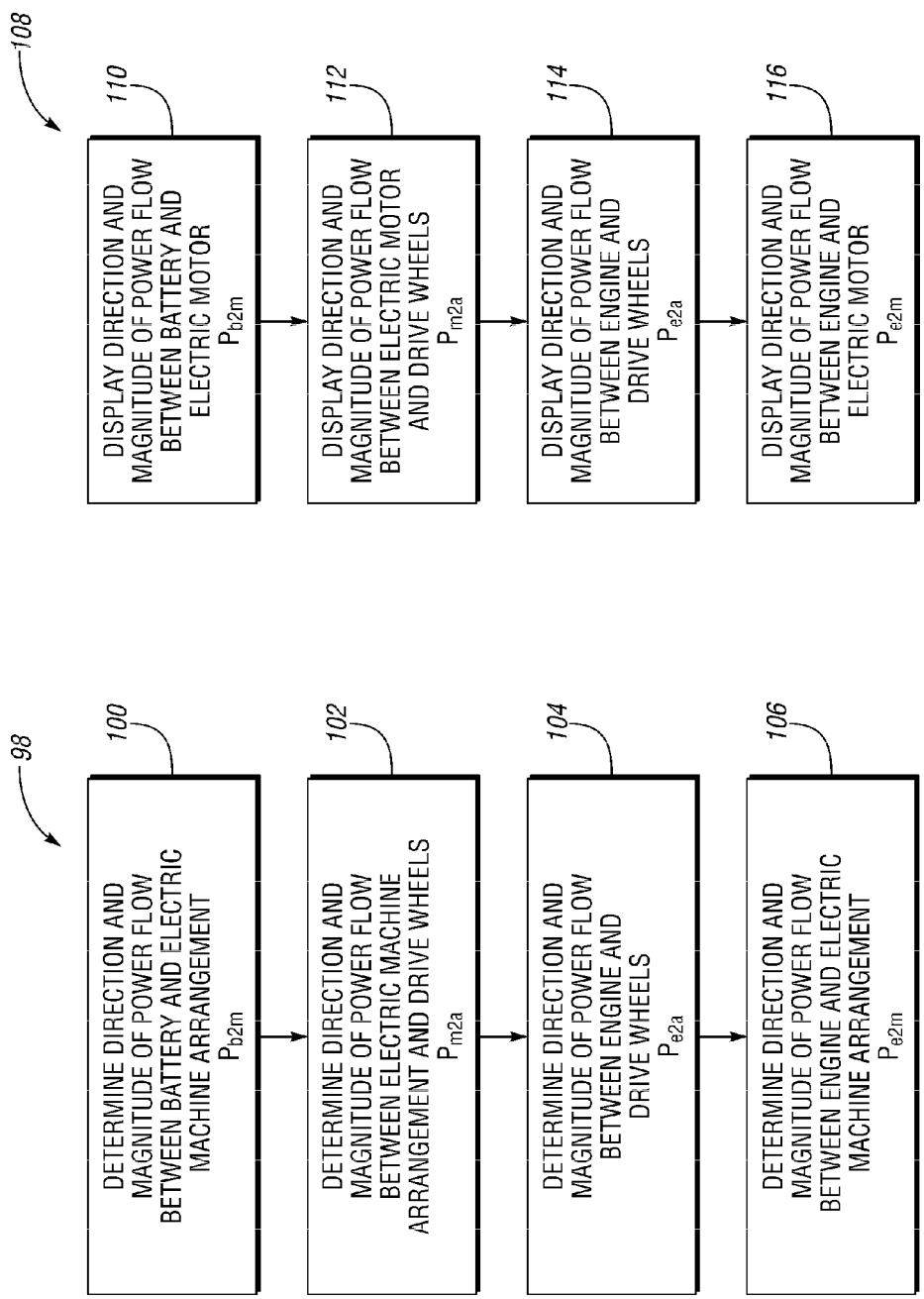

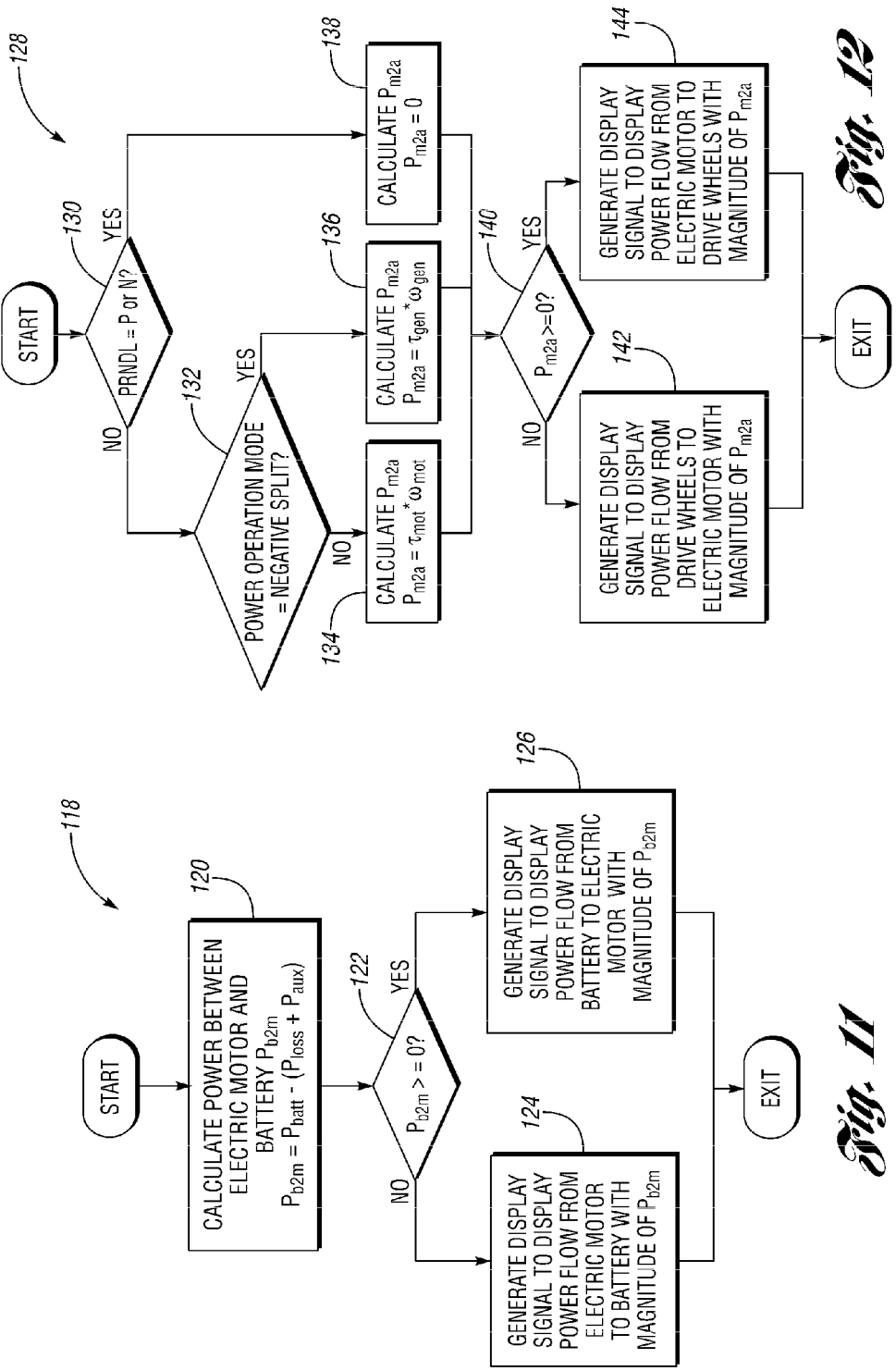

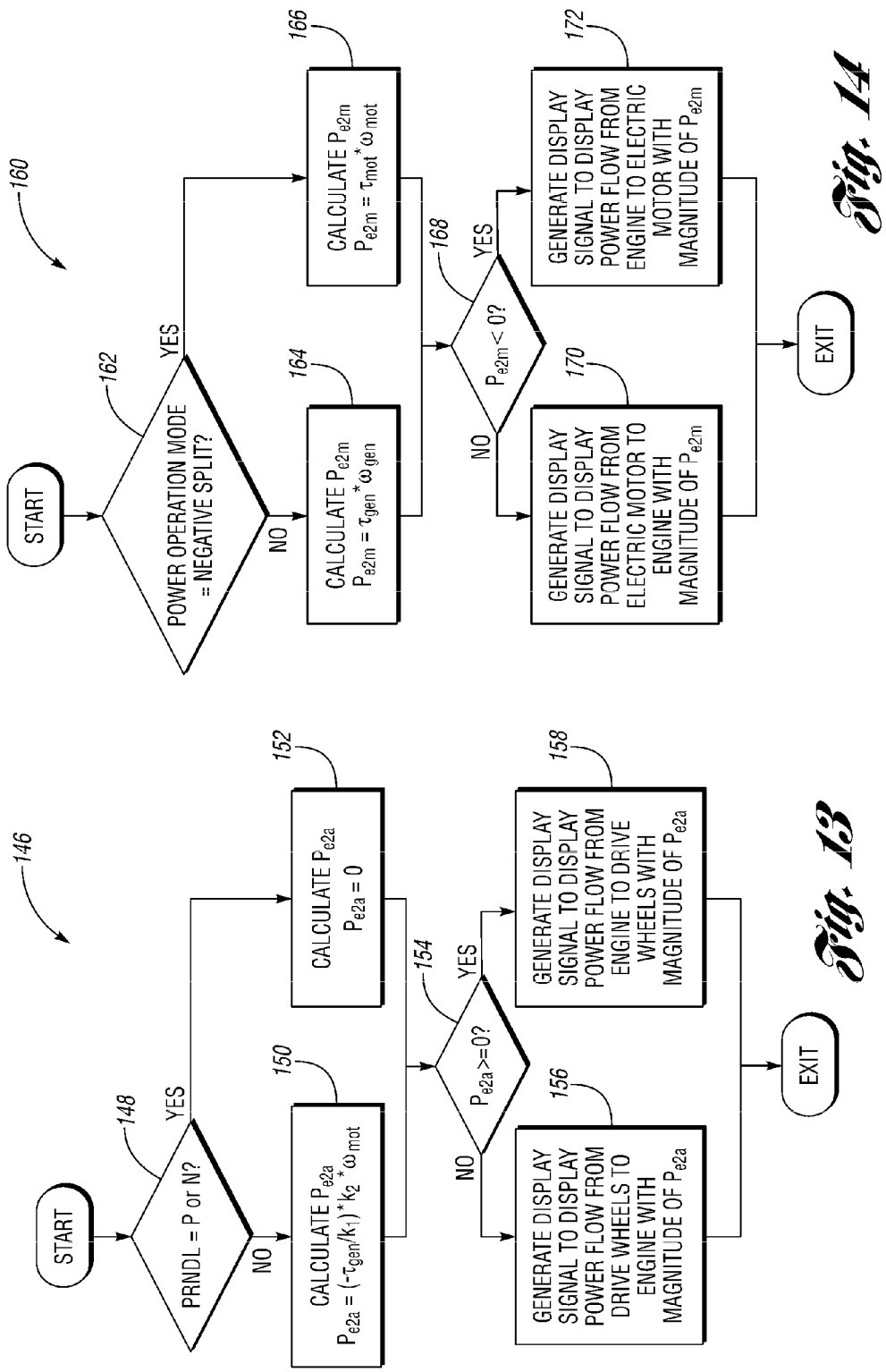

SYSTEM AND METHOD FOR DISPLAYING POWER FLOW IN A HYBRID VEHICLE

CROSS-REFERENCE TO RELATED APPLICATION

This application claims the benefit of the U.S. Provisional Application filed Jun. 1, 2009, and having Application No. 61/182,800.

BACKGROUND

1. Technical Field

System and method for displaying power flow in a hybrid vehicle.

2. Background Art

Conventional vehicles, such as those powered by a single internal combustion engine, often provide a vehicle operator with information through a number of commonly used displays. For example, speedometers, odometers, tachometers, fuel level gauges, oil level indicators and engine temperature gauges are commonly used to provide information in analog and/or digital form. With the increase in prevalence of non-conventional vehicles, such as hybrid vehicles, a need has arisen to provide a vehicle operator with additional information unique to these non-conventional vehicles.

The parallel-series hybrid electric vehicle (PSHEV) has powertrain characteristics of both a parallel hybrid electrical vehicle and a series hybrid electric vehicle (SHEV). The PSHEV includes an engine, an electric generator, and an electric motor. Both the engine and the electric motor can be coupled to the drive wheels of the vehicle to provide propulsion power to drive wheels of the vehicle. In addition, the generator and the motor can be referred to as electric machines since either is capable of acting as a motor under certain driving conditions and as a generator under other driving conditions.

The PSHEV powertrain is sometimes known as a "power-split" hybrid vehicle because the engine power output is "split" by a planetary gear set between a series path from the engine to the electric generator and a parallel path from the engine to the drive wheels.

The PSHEV has two power sources. The first power source of the PSHEV includes the engine and the electric generator, including a power transfer unit, such as a planetary gear set. The power transfer unit mechanically couples the engine, the drive wheels, and the electric generator. The electric generator of the PSHEV is usually connected to the sun gear of the planetary gear set. The engine is usually connected to the planetary carrier while the drive wheels are usually connected to the ring gear. In a negative split mode, the generator in the PSHEV outputs power to the planetary gear set. In a positive split mode, the generator receives power from the engine through the planetary gear set. The negative and positive split modes may be referred to as power operation modes of the PSHEV.

The second power source of the PSHEV is an electric drive including the electric motor, the electric generator, and an energy storage device (hereinafter "battery"). The battery in the PSHEV is electrically coupled to the electric traction motor as well as the electric generator. The battery can act as an energy storage medium for both the electric generator and the electric motor. In operation, the electric generator can provide electric power to either the battery, the electric motor, or both the battery and the electric motor. The electric motor, the electric generator, and the battery may be referred to as an electric drive system.

Since the PSHEV has both the engine and the electric motor, the PSHEV can be powered by either one or both of these torque-producing devices. Thus, the PSHEV can selectively use the engine, the electric motor, or both in combination to provide propulsion power to the drive wheels.

In these types of vehicles, it may be beneficial to provide a vehicle operator with information regarding the flow of power between these various devices, and to and from the drive wheels. Such information may be important to the operation of the vehicle. In addition, such information may provide a vehicle operator with a better understanding of the operation of the non-conventional vehicle.

An information display for a hybrid vehicle is described in a U.S. Patent Application having Publication Number 2007/0208468 and a publication date of Sep. 6, 2007.

SUMMARY

A system and method is provided for displaying component icons and a graphical representation of power flows. The graphical representation of power flows is displayed between pairs of the component icons in a hybrid vehicle. The component icons represent components of the hybrid vehicle including an engine, a battery, drive wheels, and an electric machine arrangement. The electric machine arrangement has an electric motor and an electric generator.

The method includes determining a mode of operation of the hybrid vehicle, processing powertrain signals, calculating magnitude and direction of power flow, and displaying the component icons and a graphical representation of the power flow. The powertrain signals are processed to obtain a torque value and a speed value based on the mode of operation. The torque and speed values represent respective torque and speed of at least one of the electric motor and the electric generator. The power flow is between the electric machine arrangement and at least one of the engine and the drive wheels. The magnitude and direction of power flow is calculated based on the torque and speed values. The graphical representation of the power flow is between at least one pair of the component icons and represents the magnitude and the direction of the power flow.

The system includes a computer-readable storage medium, at least one controller, a signal processor, and a data processor. The controller is in communication with the storage medium and determines a mode of operation of the hybrid vehicle. The signal processor processes powertrain signals to obtain torque data and speed data based on the mode of operation. The torque and speed data represent respective torque and speed of at least one of the electric motor and the electric generator. The data processor calculates magnitude and direction of power flow between the electric machine arrangement and at least one of the engine and the drive wheels based on the torque and speed data. In addition, the controller controls a display unit to display the component icons and a graphical representation of the power flow. The graphical representation is between at least one pair of the component icons and represents the magnitude and the direction of the power flow.

At least one processor-readable storage medium is also provided. The storage medium has processor-readable code embodied thereon. The code is used to program at least one processor to perform the method of displaying component icons and a graphical representation of power flows between pairs of the component icons in the hybrid vehicle.

BRIEF DESCRIPTION OF THE DRAWINGS

FIG. 9 is a flowchart diagram illustrating a method of processing powertrain signals to obtain display signals;

FIG. 10 is a flowchart diagram illustrating a method of displaying a graphical representation of power flows based on the display signals;

FIG. 11 is a flowchart diagram illustrating a method of determining direction and magnitude of power flow between the battery and the electric motor;

FIG. 12 is a flowchart diagram illustrating a method of determining direction and magnitude of power flow between the electric motor and the drive wheels;

FIG. 13 is a flowchart diagram illustrating a method of determining direction and magnitude of power flow between the engine and the drive wheels; and FIG. 14 is a flowchart diagram illustrating a method of determining direction and magnitude of power flow between the engine and the electric motor.

DETAILED DESCRIPTION

Embodiments of the present invention generally provide a system and method for displaying power flow in a hybrid vehicle. The hybrid vehicle may be any type of hybrid vehicle, such as a hybrid electric vehicle (HEV), a plug-in hybrid electric vehicle, or a hybrid fuel cell electric vehicle (FCEV).

Figure 1:
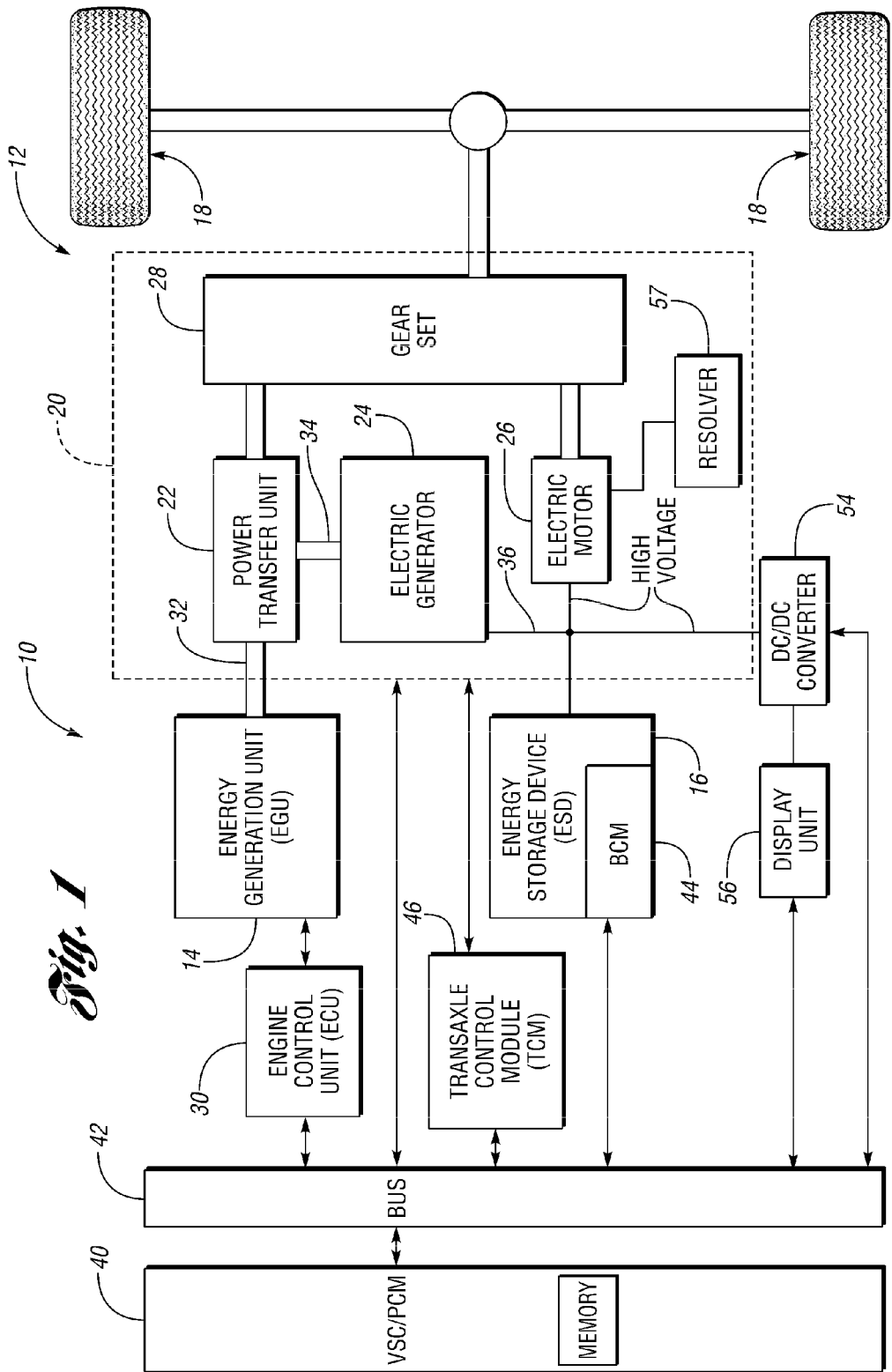
FIG. 1 is a schematic diagram illustrating a hybrid vehicle including an engine, an electric motor, a battery, drive wheels, and a display unit.

With reference to FIG. 1, a system 10 for displaying power flow in a hybrid vehicle 12 is provided. The system 10 of FIG. 1 is shown integrated with a powertrain of a parallel/series hybrid electric vehicle (PSHEV) or power split hybrid vehicle. The system 10 and its method of operation are described in an integrated manner to facilitate understanding of various aspects of the present invention.

As illustrated in FIG. 1, the hybrid vehicle 12 includes an energy generation unit (EGU) 14 (also referenced as "engine"), an energy storage device (ESD) 16 (also referenced as "battery"), and drive wheels 18. The engine 14 and the battery 16 selectively provide power to the drive wheels 18 so that the hybrid vehicle 12 can be propelled.

The hybrid vehicle 12 includes a transaxle 20, which is analogous to a transmission in a conventional vehicle. The transaxle 20 includes a power transfer unit 22, an electric generator 24, an electric motor 26, and a gear set 28. The transaxle 20 is coupled between the drive wheels 18 and the engine 14 and the battery 16 to control how and when power is transferred to the drive wheels 18. The electric motor 26 and the electric generator 24 are two electric machines that make up an electric machine arrangement. Thus, the motor 26 and the electric generator 24 each represent a portion of the electric machine arrangement. However, the hybrid vehicle 12 may have different electric machine arrangements, such as more or less than two electric machines. The motor 26 and the electric generator 24 of FIG. 1 can both be used as motors to output torque. Alternatively, each can also be used as a generator that outputs electrical power. When the electric generator 24 outputs power to the power transfer unit 22 (e.g., planetary gear set), the hybrid vehicle 12 is operating in a negative split mode. In a positive split mode, the electric generator 24 receives power from the EGU (e.g., engine) through the power transfer unit 22. The negative and positive split modes may be referred to as power operation modes of the hybrid vehicle 12.

The EGU 14 of FIG. 1 can be an internal combustion engine (ICE) augmented with the electric generator 24. Other types of EGU-transaxle designs may be used depending on the configuration of the hybrid vehicle 12.

The ESD 16 of FIG. 1 can be a high voltage battery that outputs or stores electrical power when operating together with the electric motor 26 and the electric generator 24. As a device that can store electrical energy, the battery 16 has a state of charge (SOC). In addition, the battery 16 can output an amount of battery power, which may be referenced as "$P_{batt}$". The hybrid vehicle 12 may redistribute power between the engine 14 and the ESD 16. For example, the ESD 16 can store excess power generated by the engine 14. In another example, the ESD 16 can provide power to the engine 14. Alternatively, the ESD 16 may be an ultra-capacitor or a mechanical flywheel unit, which, like the high voltage battery, are capable of both storing and outputting energy to propel the hybrid vehicle 12. Other types of energy storage devices and output devices can be used with the engine 14 to provide power to the drive wheels 18 of the hybrid vehicle 12.

As shown in FIG. 1, the power transfer unit 22 of the transaxle 20 mechanically connects the engine 14 and the electric generator 24. Furthermore, the power transfer unit 22 may be a planetary gear set having a ring gear, a carrier, planet gears, and a sun gear. Alternatively, the power transfer unit 22 may include other types of gear sets and transmissions for coupling the engine 14 to the electric generator 24. The power loss between the electric motor 26 and the generator 24 may be referred to as "$P_{loss}$." $P_{loss}$ can be determined for different speeds and torques of the electric motor 26 and the generator 24.

As depicted in FIG. 1, the hybrid vehicle 12 includes an engine control unit 30, which may include an electronic throttle control (ETC) system. The ETC regulates the flow of air and thus fuel vapor into the engine 14 thereby controlling torque that the engine 14 outputs. The engine 14 outputs torque to shaft 32 connected to the power transfer unit 22. The power transfer unit 22 receives the power from the engine 14 through the shaft 32 and transfers the power either to the drive wheels 18 through gear set 28 of the transaxle 20 or to the electric generator 24. In addition to receiving power from the engine 14, the power transfer unit 22 can also receive power from the electric generator 24.

Referring to FIG. 1, the electric generator 24 can be used as either an electric motor, a machine that converts mechanical energy into electrical energy, or both. Operating as an electric motor, the electric generator 24 outputs torque to shaft 34 connected to the power transfer unit 22, which can transfer the torque to the engine 14. Because the electric generator 24 can transfer torque to the engine 14, the electric generator 24 can control a speed of the engine 14. Operating as a machine that converts mechanical energy into electrical energy, the electric generator 24 outputs electrical power to a high voltage bus 36. The high voltage bus 36 receives the electrical power from the electric generator 24 and distributes the electrical power between the battery 16 and the electric motor 26, depending on the driving mode of the hybrid vehicle 12.

With continuing reference to FIG. 1, the system 10 includes a controller 40 or some other type of programmable logic device to control various components of the powertrain of the hybrid vehicle 12. The controller 40 of FIG. 1 is shown as a combination of a vehicle system controller (VSC) and a powertrain control module (PCM). The combination of the VSC and the PCM is hereinafter referenced as a "VSC/PCM" having reference numeral 40. Although the VSC/PCM 40 is shown as a single hardware device, the VSC/PCM 40 may include multiple controllers in the form of multiple hardware devices, or multiple software controllers within one or more hardware devices. For example, the VSC/PCM 40 may include a signal processor to process powertrain signals. In another example, the VSC/PCM 40 may include a data processor to process data, such as torque and speed data.

The system 10 includes a computer-readable storage medium (hereinafter "memory") to store a computer program or algorithm embedded or encoded with the method. The memory can be part of the VSC/PCM 40 as shown in FIG. 1. However, the memory may be positioned in any suitable portion of the system 10 accessible to the VSC/PCM 40. In addition to storing the computer program or algorithm, the memory of the system 10 also stores data or information about the various components in the hybrid vehicle 12 to implement the method. For example, the memory may store torque and speed data of the electric motor 26, the electric generator 24, or both the electric motor 26 and the electric generator 24.

As shown in FIG. 1, the VSC/PCM 40 controls the transaxle 20, the engine 14, and the battery 16 through a vehicle data bus 42 (hereinafter "data bus"). The data bus 42 is in communication with various components of hybrid vehicle 12 including one or more controllers of the transaxle 20, the engine 14, and the battery 16. The data bus 42 may be implemented as a controller area network (CAN), a local interconnect network (LIN), or any such suitable data-communication link that can transfer data between the controller 40 and other devices in the hybrid vehicle 12.

The VSC/PCM 40 can control the transaxle 20, the engine 14, and the battery 16 either directly or through separate controllers that control the transaxle 20, the engine 14, or the battery 16 under supervisory control of the VSC/PCM 40. For example, the VSC/PCM 40 may communicate with the engine control unit 30 to control the engine 14. Similarly, the VSC/PCM 40 may communicate with a battery control module (BCM) 44 to control the battery 16. The BCM 44 transmits and receives signals to and from the VSC/PCM 40 and the battery 16.

The transaxle 20 may also include one or more controllers, such as a transaxle control module (TCM) 46, configured to control specific components within the transaxle 20, such as the electric generator 24 and the electric motor 26. The VSC/PCM 40 and the TCM 46 operate to control the various modes of the transaxle 20 (e.g., park, neutral, forward, and reverse). Either the VSC/PCM 40 or the TCM 46 may directly receive a signal having PRNDL position information (i.e., gear shift selection information for park, reverse, neutral, drive, low-drive) to shift the transaxle 20 into the desired mode. For example, the hybrid vehicle 12 can be driven forward and accelerate through a range of gears when the transaxle 20 is shifted into a forward mode. Similarly, the hybrid vehicle 12 can be driven backward when the transaxle 20 is shifted into a reverse mode. The various modes of the transaxle 20 can be communicated to the VSC/PCM 40 via the TCM 46 or directly to the VSC/PCM 40 via signals that the transaxle 20 provides to VSC/PCM 40 through the data bus 42.

With continuing reference to FIG. 1, the system 10 includes a DC/DC converter 54. The DC/DC converter 54 is connected to the high voltage bus 36. The DC/DC converter 54 reduces the voltage it receives, and outputs power at this lower voltage to a number of low voltage electrical devices in the vehicle 12. For example, the DC/DC converter may output a low voltage of 12 volts.

With continuing reference to FIG. 1, the system 10 includes a display unit 56 or some other type of graphical unit that can communicate to an occupant of the hybrid vehicle 12. The display unit 56 may receive power from the DC/DC converter 54 as well as information or data about the DC/DC converter 54 through the data bus 42. In addition, the display unit 56 can communicate with the VSC/PCM 40, the battery 16, and the transaxle 20 to obtain other information and data. Signals output from the various components of the vehicle 12 can be processed, and display calculations can be performed, in the VSC/PCM 40, the display unit 56, or a combination thereof. Although the display unit 56 of FIG. 1 is shown as a separate controller, the display unit 56 may also be integrated directly into the VSC/PCM 40.

The VSC/PCM 40 receives a number of inputs including driver inputs, such as acceleration pedal position, brake pedal position, and transmission gear selection that indicates which gear the driver has selected (e.g., park, neutral, forward, or reverse). Furthermore, the VSC/PCM 40 receives non-driver inputs, such as the speed of the engine 14, motor speed $\omega_{mot}$, motor torque $\tau_{mot}$, generator speed $\omega_{gen}$, generator torque $\tau_{gen}$, battery power $P_{batt}$, motor and generator power loss $P_{loss}$, and auxiliary load power loss $P_{aux}$. The VSC/PCM 40 can communicate with the BCM 44, the TCM 46, the engine control unit 30, the DC/DC converter 54, the display unit 56, or a combination thereof through the data bus 42 to obtain the various inputs.

Any suitable device in the hybrid vehicle 12 can provide information indicating the speed of the engine 14 to the VSC/PCM 40 or the display unit 56. For example, a speed sensor may provide the speed of the engine 14 to the VSC/PCM 40. The speed sensor can be an engine position sensor that produces a predetermined number of equally spaced pulses for each revolution of the crankshaft. The VSC/PCM 40 can receive the spaced pulses from the speed sensor to determine the speed of the engine 14. The speed of the engine 14 can be expressed in revolutions per minute (RPM) or any other suitable form for the VSC/PCM 40.

Any suitable device in the hybrid vehicle 12 can provide information indicating the speed "$\omega_{mot}$" of the electric motor 26 to the VSC/PCM 40 or display unit 56. In one example, the TCM 46 can provide the motor speed "$\omega_{mot}$" to the VSC/PCM 40, which may be based on commands to the motor 26. In another example, the system 10 may include a resolver 57. The resolver 57 senses position of a rotor in the motor 16 and generates a resolver signal having rotor position information embedded or encoded therein. The VSC/PCM 40 and/or TCM 46 can receive the resolver signal to obtain various values (e.g., $L_d$, $L_q$, $R_s$ and $\lambda_{pm}$) and operation conditions ($V_d$, $V_q$, and $\omega$) of the motor 26. Based on the values and operating conditions of the electric motor 26, the VSC/PCM 40 and/or TCM 46 can determine the speed "$\omega_{mot}$" of the motor 26.

Any suitable device in the hybrid vehicle 12 can provide information to the VSC/PCM 40 or the display unit 56 that indicates the torque "$\tau_{mot}$" that the motor outputs to gear set 28. For example, the TCM 46 can determine the motor torque "$\tau_{mot}$" and transmit a signal embedded or encoded with the motor torque "$\tau_{mot}$" to the VSC/PCM 40. The TCM 46 may determine the motor torque "$\tau_{mot}$" as being the commanded motor torque that the motor 26 is commanded to deliver.

Any suitable device in the hybrid vehicle 12 can provide information indicating speed "$\omega_{gen}$" of the electric generator 24 to the VSC/PCM 40 or the display unit 56. In one example, the TCM 46 can provide the generator speed "$\omega_{gen}$" to the VSC/PCM 40 based on commands to the electric generator 24. Alternatively, a generator resolver (not shown) may sense position of shaft 34 and generate a generator resolver signal for shaft 34 having generator speed information embedded or encoded therein. The VSC/PCM 40 and/or TCM 46 can obtain and process various values and operation conditions of the electric generator 24 from the generator resolver signal to determine the speed "$\omega_{gen}$" of the electric generator 24.

Any suitable device in the hybrid vehicle 12 can provide information to the VSC/PCM 40 that indicates the torque "$\tau_{gen}$" between the electric generator 24 and shaft 34. For example, the TCM 46 can determine the generator torque "$\tau_{gen}$" and transmit a signal embedded or encoded with the generator torque "$\tau_{gen}$" to the VSC/PCM 40 through the data bus 42. The TCM 46 may determine the generator torque "$\tau_{gen}$" as being the commanded generator torque that the electric generator 24 is commanded to deliver.

In response to input signals to the VSC/PCM 40, the VSC/PCM 40 and/or the display unit 56 determines power flow directions and magnitudes between various components in the powertrain of the hybrid vehicle 12. Thus, the display unit 56 may receive one or more of the input signals having such information and data to determine the power flow directions and magnitudes either alone or in combination with the VSC/PCM 40. The input signals include information and data to determine the power flow directions and magnitudes such as the motor speed $\omega_{mot}$, motor torque $\tau_{mot}$, generator speed $\omega_{gen}$, generator torque $\tau_{gen}$, battery power $P_{batt}$ motor and generator power loss $P_{loss}$, and auxiliary load power loss $P_{aux}$. The auxiliary load power loss $P_{aux}$ may be due to a number of loads, such as a heating, ventilating, and air conditioning (HVAC) system as well as the low voltage electrical devices in the vehicle 12.

FIGS. 2-7 illustrate examples of different display configurations that the display unit 56 can display to the occupant in the vehicle 12. Each figure shows one possible display configuration of the display unit 56. However, the display unit 56 can display a variety of information about the hybrid vehicle 12 based on the power flow directions and magnitudes obtained from the VSC/PCM 40, the display unit 56, or a combination of both. In doing so, the display unit 56 represents the vehicle 12 and power flows in the vehicle 12 in an iconic representation or graphical representation 58. Based on the information displayed from the graphical representation 58, the occupant in the hybrid vehicle 12, such as a vehicle operator, can understand the flow of power between various devices in the hybrid vehicle 12, such as the engine 14, the motor 26, the electric generator 24, the battery 16, the electric machine arrangement, the drive wheels 18, or a combination thereof. Such information about the power flow provides the occupant with a sense of how each of the various devices in the vehicle is interacting with other devices in the vehicle 12. In addition, power flow information may be important to the operation of the vehicle 12. For example, such power flow information may help the occupant improve the operation of the hybrid vehicle 12. In such an example, the occupant may operate the vehicle 12 in an effort to reduce fuel consumption of the engine 14 as well as to reduce other energy usage in the vehicle 12.

Figure 2:
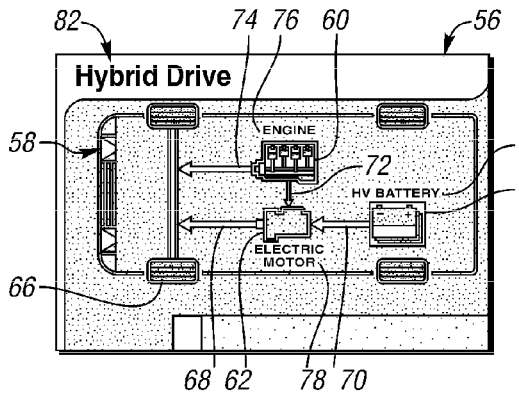
FIG. 2 is a graphical representation of power flows when the vehicle in a hybrid drive state.

As shown in FIG. 2, the graphical representation 58 of the vehicle 12 includes an engine icon 60, a motor icon 62, an energy storage device icon or battery icon 64, and a drive wheels icon 66. The engine icon 60 represents the engine 14 in the vehicle 12. The motor icon 62 represents the electric machine arrangement (i.e., the electric motor 26 and/or the electric generator 24) in the vehicle 12. The battery icon 64 represents the battery 16. And, the drive wheels icon 66 represents the drive wheels 18.

One function of the display unit 56 is to display the direction and relative magnitude of power flows between various components in the vehicle 12, such as the engine 14, the electric generator 24, the electric motor 26, the battery 16, and the drive wheels 18. The display unit 56 of FIG. 2 is shown displaying four different power flow indicators, namely, a first power flow indicator 68, a second power flow indicator 70, a third power flow indicator 72, and a fourth power flow indicator 74.

The first power flow indicator 68 (hereinafter "$P_{m2a}$ indicator") is selectively displayed between the motor icon 62 and the drive wheels icon 66 to indicate the direction and relative magnitude of power being transferred between the electric machine arrangement (i.e., the electric motor 26 and/or the electric generator 24 depending on the powertrain operating mode, e.g. positive split mode or negative split mode) and the drive wheels 18. The motor icon 62 represents the electric machine arrangement for the display unit 56. An arrow having a tail and an arrowhead may represent the $P_{m2a}$ indicator 68. The arrowhead indicates the direction of power flow between the electric machine arrangement, such as the electric motor 26, and the drive wheels 18. The arrowhead of FIG. 2 points toward the drive wheels icon 66 to show the power flow from the electric machine arrangement to the drive wheels 18. However, the arrowhead can point in an opposite direction toward the motor icon 62 to show the power flow from the drive wheels 18 to the electric machine arrangement. In addition, the display unit 56 can display the $P_{m2a}$ indicator 68 to indicate the relative magnitude of power being transferred between the between the electric machine arrangement and the drive wheels 18. For example, the display unit 56 can display the $P_{m2a}$ indicator 68 at a number of different thicknesses. In such an example, as the power output from the electric machine arrangement to the drive wheels 18 increases, the thickness of the $P_{m2a}$ indicator 68 can increase. Similarly, as the power from the electric machine arrangement to the drive wheels 18 decreases, the thickness of the $P_{m2a}$ indicator 68 can decrease. Alternatively, the display unit 56 can display the $P_{m2a}$ indicator 68 as a set of spaced bar indicators, each of the bar indicators representing a greater amount of power being transferred between the electric machine arrangement and the drive wheels 18.

The second power flow indicator 70 (hereinafter "$P_{b2m}$ indicator") is selectively displayed between the motor icon 62 and the battery icon 64 to indicate the direction and relative magnitude of power being transferred between the electric machine arrangement (i.e., electric motor 26 and/or the electric generator 24) and the battery 16. Like the $P_{m2a}$ indicator 68, an arrow having a tail and an arrowhead may represent the $P_{b2m}$ indicator 70. The arrowhead of the $P_{b2m}$ indicator 70 indicates the direction of power flow between the electric machine arrangement and the battery 16.

As shown in FIG. 2, the arrowhead of the $P_{b2m}$ indicator 70, points toward the motor icon 62 (representing both the electric motor 26 and the electric generator 24) to show the power flow from the battery 16 to the electric machine arrangement. However, the arrowhead of the $P_{b2m}$ indicator 70 can point in an opposite direction toward the battery 16 to show the power flow from the electric machine arrangement (i.e., the electric motor 26 and/or the electric generator 24 depending on the powertrain operating mode, e.g. positive split mode or negative split mode) to the battery 16. In addition, the display unit 56 can display the $P_{b2m}$ indicator 70 to indicate the relative magnitude of power being transferred between the electric machine arrangement and the battery 16. For example, the display unit 56 can display the $P_{b2m}$ indicator 70 at a number of different thicknesses. In such an example, as the power output from the battery 16 to the electric motor 26 increases, the thickness of the $P_{b2m}$ indicator 70 can increase. Similarly, as the power from the battery 16 to the electric motor 26 decreases, the thickness of the $P_{b2m}$ indicator 70 can decrease. Alternatively, the display unit 56 can display the $P_{b2m}$ indicator 70 as a set of spaced bar indicators, each of the bar indicators representing a greater amount of power being transferred between the electric machine arrangement and the battery 16.

The third power flow indicator 72 (hereinafter "$P_{e2m}$ indicator") is selectively displayed between the engine icon 60 and the motor icon 62 to indicate the direction and relative magnitude of power being transferred between the engine 14 and the electric machine arrangement (i.e., the electric generator 24 and/or the electric motor 26 depending on the powertrain operating mode, e.g. positive split or negative split). Like indicators 68, 70, an arrow having a tail and an arrowhead may represent the $P_{e2m}$ indicator 72 with arrowhead of the $P_{e2m}$ indicator 72 indicating the direction of power flow. Similar to indicators 68, 70, the display unit 56 can display the $P_{e2m}$ indicator 72 to indicate the relative magnitude of power being transferred between the engine 14 and the electric machine arrangement.

The fourth power flow indicator 74 (hereinafter "$P_{e2a}$ indicator") is selectively displayed between the engine icon 60 and the drive wheels icon 66 to indicate the direction and relative magnitude of power being transferred between the engine 14 and the drive wheels 18. Like indicators 68, 70, an arrow having a tail and an arrowhead may represent the $P_{e2a}$ indicator 74 with arrowhead of the $P_{e2a}$ indicator 74 indicating the direction of power flow.

Similar to indicators 68, 70, the display unit 56 can display the $P_{e2a}$ indicator 74 to indicate the relative magnitude of power being transferred between the engine 14 and the drive wheels 18.

Referring again to FIG. 2, the engine icon 60, the motor icon 62, and the battery icon 64 each may have a respective textual label 76, 78, 80 that indicates what each icon represents. As shown, the engine icon 60 has a textual label of "ENGINE" and the battery icon 64 has a textual label of "HV BATTERY". In addition, the motor icon 62 has a textual label of "ELECTRIC MOTOR", though it is understood that the motor icon 62 can represent both the electric motor 26 and the electric generator 24. Because the motor icon 62 can represent both the electric motor 26 and the electric generator 24, certain protocols may be programmed into the VSC/PCM 40, the display unit 56, or both to provide the appropriate display on the display unit 56 when power is being transferred to or from the electric machine arrangement.

As shown in FIGS. 2-7, the display unit 56 can include a textual indicator 82. The textual indicator 82 indicates a state of operation of the vehicle 12 to the occupant in the vehicle 12. The state of operation corresponds to the power transferred between the battery 16, the electric motor 26, the electric generator 24, the engine 14, and the drive wheels 18. Including the textual indicator 82 can help the vehicle operator understand the various states of operation of the vehicle 12. Thus, the graphical representation 58, combined with the textual indicator 82, can provide the vehicle operator with an understanding of the vehicle 12 that text and gauges alone cannot provide.

Referring again to FIG. 2, the vehicle 12 is operating in a "Hybrid Drive" state. In the "Hybrid Drive" state, both the engine 14 and the electric motor 26 contribute torque to the drive wheels 18.

Figure 3:
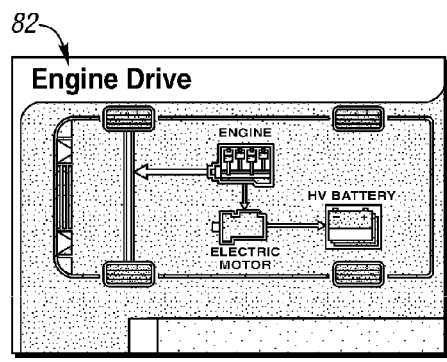
FIG. 3 is a graphical representation of power flows when the vehicle in an engine drive state.

Referring to FIG. 3, the textual indicator 82 indicates an "Engine Drive" state. In the "Engine Drive" state, only the engine 14 contributes torque to the drive wheels 18.

Figure 4:
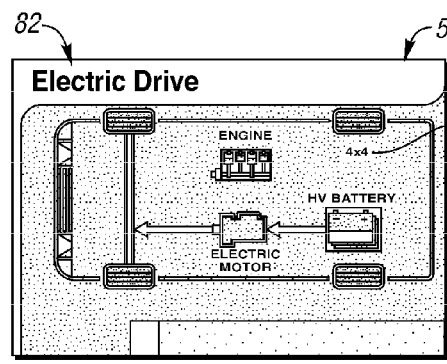
FIG. 4 is a graphical representation of power flows when the vehicle in an electric drive state.

Referring to FIG. 4, the textual indicator 82 indicates an "Electric Drive" state. In the "Electric Drive" state, only the electric motor 26 contributes torque to the drive wheels 18. The display unit 56 of FIG. 4 also displays a four-wheel drive indicator 84. The four-wheel drive indicator 84 indicates when both sets of wheels in the vehicle 12 receive torque.

Figure 5:
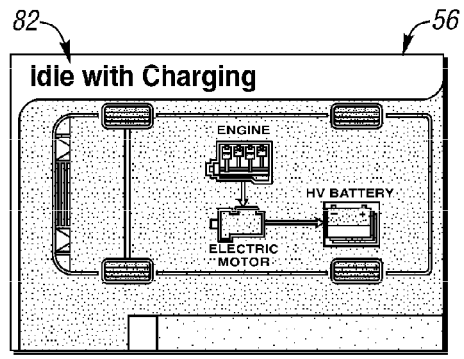
FIG. 5 is a graphical representation of power flows when the vehicle in an idle with charging state.
Figure 6:
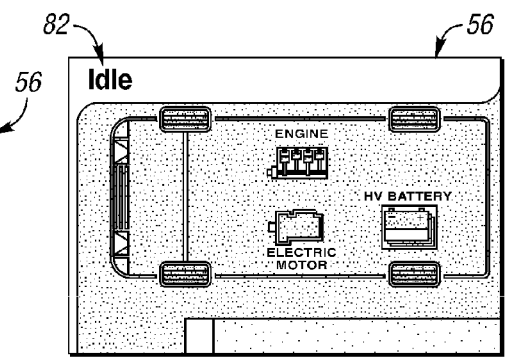
FIG. 6 is a graphical representation of power flows when the vehicle in an idle state.

As shown in FIGS. 5-6, the display unit 56 can indicate a number of different idle states. The textual indicator 82 of FIG. 5 displays an "Idle with Charging" state. In the "Idle with Charging" state, the electric generator 24 is charging the battery 16, but no torque is transferred to or from the drive wheels 18. The textual indicator 82 of FIG. 5 displays a pure "Idle" state. In the "Idle" state, no power is transferred between the engine 14, the electric generator 24, the electric motor 26, the battery 16, and the drive wheels 18.

Figure 7:
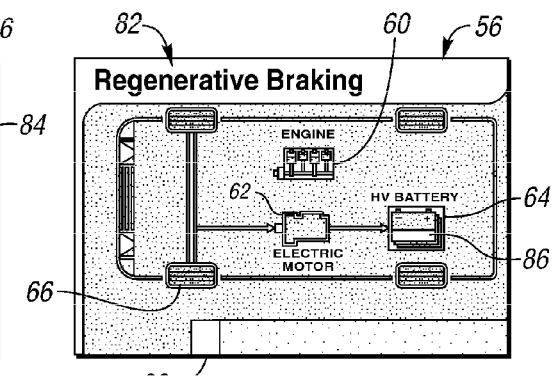
FIG. 7 is a graphical representation of power flows when the vehicle in a regenerative braking state.

As discussed above, the energy storage device used on the vehicle 12 can be a high voltage battery 16. The display unit 56 of FIG. 7 shows a "Regenerative Braking" state. In the "Regenerative Braking" state, torque is transferred from the drive wheels 18 to the electric machine arrangement (i.e., the electric generator 24 and/or electric motor 26), which charges the battery 16.

Referring again to FIG. 7, the battery icon 64 may include a shaded area 86. As the battery 16 is being charged, the shaded area 86 within the battery icon 64 will increase. The shaded area 86 indicates the SOC of the battery 16, which gives the vehicle operator additional information regarding the state of the vehicle 12.

Although arrows having respective arrowheads and arrow thicknesses were shown in FIGS. 2-7 as one embodiment of the power flow indicators, other types of power flow indicators may be used. For example, the power flow indicators may be displayed as a series of dots or dashes, rather than a continuous line. The diameter or width of the dots or dashes could then be increased to indicate the magnitude of the power flow. The brightness of the dots or dashes could be sequentially increased in one direction between the icons shown in the display unit 56. This could be used as an animated indicator of the direction of the power flow.

The display unit 56 of FIGS. 2-7 may highlight the drive wheels icon 66, the motor icon 62, and the battery icon 64. Highlighting an icon, or otherwise identifying an icon, can be done in different colors to provide different information about the vehicle component corresponding to the highlighted icon. For example, if an icon is highlighted, or otherwise identified with one color, such as orange, it can indicate that power is being transferred to or from the corresponding component. Conversely, an icon may be identified in a different color, such as red, for example, to indicate the presence of an anomalous condition in the corresponding vehicle component. The vehicle operator is thus informed that service may be necessary on that component.

Figure 8:
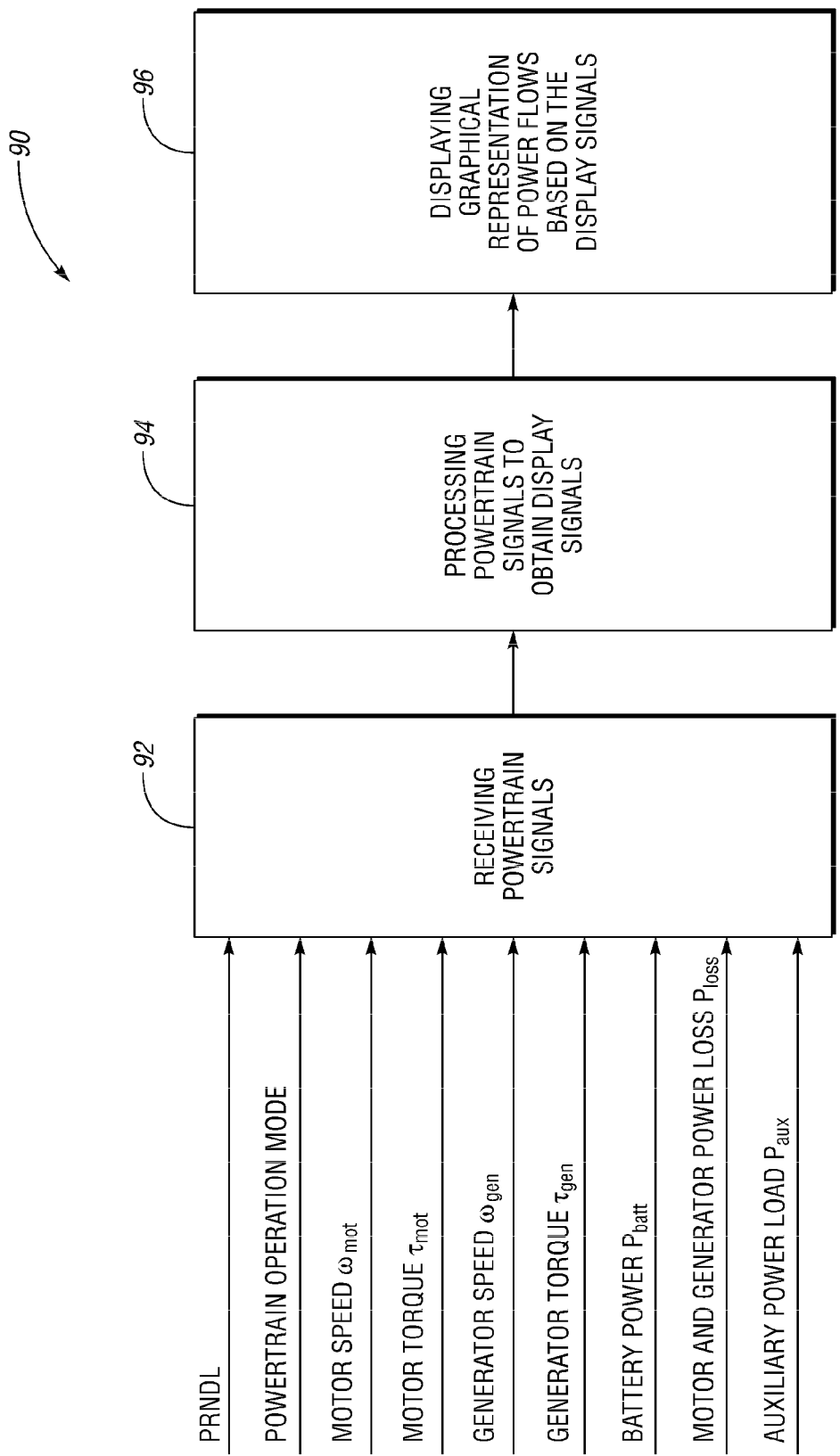
FIG. 8 is a flowchart diagram illustrating a method of displaying graphical representations of power flows.

With reference to FIG. 8, flowchart diagram 90 illustrates steps of a method of displaying power flow in a hybrid vehicle is provided. The method can be used to provide an occupant in the vehicle 12 with information via the display unit 56. The method of displaying power flow may implemented through a computer algorithm, machine executable code, or a software program programmed into a suitable programmable logic device(s) of the hybrid vehicle 12, such as the VSC/

PCM 40, the engine control unit 30, the TCM 46, the display unit 56, or a combination thereof. In addition to the steps shown in FIG. 8, the programmable logic device may be programmed with additional steps to provide additional functionality. The hybrid vehicle 12 and its components illustrated in FIGS. 1-7 are referenced throughout the discussion of the method to facilitate understanding of various aspects of the present invention.

At step 92, powertrain signals are received. For example, the VSC/PCM 40, the display unit 56, or a combination thereof may receive the powertrain signals. One of the powertrain signals may include the signal having PRNDL position information (i.e., gear shift selection information for park, reverse, neutral, drive, low-drive). Another powertrain signal may be a signal having the operation mode of the hybrid vehicle 12. In addition, the powertrain signals may include the speed $\omega_{mot}$ of the motor 26, the torque $\tau_{mot}$ that the motor outputs, the battery power $P_{batt}$, the speed $\omega_{gen}$ of the electric generator 24, the torque $\tau_{gen}$ of the electric generator 24, the motor and generator power loss $P_{loss}$, the auxiliary load power loss $P_{aux}$, or a combination thereof. The VSC/PCM 40 and/or the display unit 56 may receive such powertrain signals through the data bus 42.

At step 94, the powertrain signals are processed to obtain display signals. The VSC/PCM 40 and/or the display unit 56 may process the powertrain signals to obtain display signals. The VSC/PCM 40 may transmit one or more of the display signals to the display unit 56 through the data bus 42.

At step 96, a graphical representation of the power flows is displayed based on the display signals. The display unit 56 uses the display signals to communicate to one or more occupants in the hybrid vehicle 12. More specifically, the display unit 56 displays the graphical representation of the power flows. As shown in FIGS. 2-7, the display unit 56 can display the graphical representation 58, which may include the engine icon 60, the motor icon 62, the battery icon 64, and the drive wheels icon 66. In addition, the display unit 56 can display the direction and relative magnitude of power flows between various components in the vehicle 12, such as the $P_{m2a}$, $P_{b2m}$, $P_{e2m}$, and $P_{e2a}$ indicators 68, 70, 72, 74. Furthermore, the display unit 56 can display the textual labels 76, 78, 80, the textual indicator 82, the four-wheel drive indicator 84, and the shaded area 86 of battery icon 64.

With reference to FIG. 9, flowchart diagram 98 illustrates steps of a method to perform step 94 shown in FIG. 8. Flowchart diagram 98 illustrates steps 100, 102, 104, 106. At least some of the steps 100, 102, 104, 106 may be performed concurrently or in a difference sequence. In addition, at least some of the steps 100, 102, 104, 106 may be ongoing with or without other steps in diagram 98.

At step 100, the direction and magnitude of power flow between the battery 16 and the electric machine arrangement (i.e., the electric motor 26 and/or the electric generator 24) is determined. In this case, the power flow between the battery 16 and the electric machine arrangement is electrical power flow, which is represented as $P_{b2m}$. The magnitude of $P_{b2m}$ represents the magnitude of power flow between the battery 16 and the electric machine arrangement while the sign (i.e., negative or positive) of $P_{b2m}$ represents the direction of power flow between the battery 16 and the electric machine arrangement.

At step 102, the direction and magnitude of power flow between the electric machine arrangement (i.e., the electric motor 26 and/or the electric generator 24 depending on the powertrain operating mode, e.g. positive split mode or negative split mode) and the drive wheels 18 is determined. In this case, the power flow between the electric machine arrangement and the drive wheels 18 is mechanical power flow, which is represented as $P_{m2a}$. The magnitude of $P_{m2a}$ represents the magnitude of power flow between the electric machine arrangement and the drive wheels 18 while the sign (i.e., negative or positive) of $P_{m2a}$ represents the direction of power flow between the electric machine arrangement and the drive wheels 18.

At step 104, the direction and magnitude of power flow between the engine 14 and the drive wheels 18 is determined. In this case, the power flow between the engine 14 and the drive wheels 18 is mechanical power flow, which is represented as $P_{e2a}$. The magnitude of $P_{e2a}$ represents the magnitude of power flow between the engine 14 and the drive wheels 18 while the sign (i.e., negative or positive) of $P_{e2a}$ represents the direction of power flow between the engine 14 and the drive wheels 18.

At step 106, the direction and magnitude of power flow between the engine 14 and the electric machine arrangement (i.e., the electric motor 26 and/or the electric generator 24) is determined. In this case, the power flow between the engine 14 and the electric machine arrangement is mechanical power flow, which is represented as $P_{e2m}$. The magnitude of $P_{e2m}$ represents the magnitude of power flow between the engine 14 and the electric machine arrangement while the sign (i.e., negative or positive) of $P_{e2m}$ represents the direction of power flow between the engine 14 and the electric machine arrangement.

In steps 100, 102, 104, and 106 of FIG. 9, the VSC/PCM 40, the display unit 56, or a combination of both can determine the magnitudes and signs of $P_{b2m}$, $P_{m2a}$, $P_{e2a}$, and $P_{e2m}$.

With reference to FIG. 10, flowchart diagram 108 illustrates steps of a method to perform step 96 shown in FIG. 8. Flowchart diagram 108 illustrates steps 110, 112, 114, 116. At least some of the steps 110, 112, 114, 116 may be performed concurrently or in a difference sequence. In addition, at least some of the steps 110, 112, 114, 116 may be ongoing with or without other steps in the diagram 108.

At step 110, the direction and magnitude of power flow between the battery icon 64 and the motor icon 62 is displayed. For example, the display unit 56 can display the $P_{b2m}$ indicator 70 between the motor icon 62 and the battery icon 64 (as shown in FIG. 2) to indicate the direction and relative magnitude of power being transferred between the electric machine arrangement (i.e., the electric motor 26 and/or the electric generator 24) and the battery 16.

At step 112, the direction and magnitude of power flow between the electric motor 26 and the drive wheels 18 is displayed. For example, the display unit 56 can display the $P_{m2a}$ indicator 68 between the motor icon 62 and the drive wheels icon 66 (as shown in FIG. 2) to indicate the direction and relative magnitude of power being transferred between the electric machine arrangement (i.e., the electric motor 26 and/or the electric generator 24) and the drive wheels 18.

At step 114, the direction and magnitude of power flow between the engine 14 and the drive wheels 18 is displayed. For example, the display unit 56 can display the $P_{e2a}$ indicator 74 between the engine icon 60 and the drive wheels icon 66 (as shown in FIG. 2) to indicate the direction and relative magnitude of power being transferred between the engine 14 and the drive wheels 18.

At step 116, the direction and magnitude of power flow between the engine icon 60 and the motor icon 62 is displayed. For example, the display unit 56 can display the $P_{e2m}$ indicator 72 between the engine icon 60 and the motor icon 62 (as shown in FIG. 2) to indicate the direction and relative magnitude of power being transferred between the engine 14 and the electric machine arrangement (i.e., the electric motor 26 and/or the electric generator 24).

With reference to FIG. 11, flowchart diagram 118 illustrates steps of a method to perform step 100 of FIG. 9 and step 94 corresponding to the power flow between the battery 16 and the electric machine arrangement.

At step 120, power flow between the battery 16 and the electric motor 26 ($P_{b2m}$) is calculated. Power flow $P_{b2m}$ can be calculated as the difference between the battery power $P_{batt}$ and the sum of both the motor and generator power loss $P_{loss}$ and the auxiliary load power loss $P_{aux}$.

At decision block 122, the sign of power flow $P_{b2m}$ is determined. The VSC/PCM 40, the display unit 56, or a combination of both can determine the sign of power flow $P_{b2m}$ based on whether the power flow $P_{b2m}$ is greater than or equal to zero. If power flow $P_{b2m}$ is less than zero, the step 124 occurs. Conversely, if power flow $P_{b2m}$ is greater than or equal to zero, then step 126 occurs. At step 124, a display signal is generated to display the power flowing from the motor icon 62 to the battery icon 64 with the magnitude of $P_{b2m}$. At step 126, a display signal is generated to display the power flowing from the battery icon 64 to the motor icon 62 with the magnitude of $P_{b2m}$. The VSC/PCM 40, the display unit 56, or a combination of both can generate the display signal for the display unit 56 to display the $P_{b2m}$ indicator 70.

With reference to FIG. 12, flowchart diagram 128 illustrates steps of a method to perform step 102 of FIG. 9 and step 94 corresponding to the power flow between the electric machine arrangement (i.e., the electric motor 26 and/or the electric generator 24) and the drive wheels 18.

At decision block 130, whether the gear shift selection is either park or neutral is determined. If the gear shift selection is neither park nor neutral, then decision block 132 occurs. Conversely, if the gear shift selection is either park or neutral, then step 138 occurs.

At decision block 132, whether the powertrain operation mode is in a negative split mode is determined. If the operation mode is not in a negative split mode, then step 134 occurs. However, if the operation mode is in a negative split mode, then step 136 occurs.

At steps 134, 136, and 138, the power flow between the electric machine arrangement (i.e., the electric motor 26 and/or the electric generator 24) and the drive wheels 18 ($P_{m2a}$) is calculated. Step 134 calculates power flow $P_{m2a}$ as the product of motor torque $\tau_{mot}$ and motor speed $\omega_{mot}$. At step 134, power flow $P_{m2a}$ may be referred to as motor mechanical power. Step 136 calculates power flow $P_{m2a}$ as the product of generator torque $\tau_{gen}$ and generator speed $\omega_{gen}$. At step 136, power flow $P_{m2a}$ may be referred to as generator mechanical power. Step 138 determines or calculates the power flow $P_{m2a}$ as zero or near zero. The VSC/PCM 40, the display unit 56, or a combination of both can perform steps 134, 136, and 138.

At decision block 140, the sign of power flow $P_{m2a}$ is determined. The VSC/PCM 40, the display unit 56, or a combination of both can determine the sign of power flow $P_{m2a}$ based on whether the power flow $P_{m2a}$ is greater than or equal to zero. If power flow $P_{m2a}$ is less than zero, the step 142 occurs. Conversely, if power flow $P_{m2a}$ is greater than or equal to zero, then step 144 occurs. At step 142, a display signal is generated to display the power flowing from the drive wheels icon 66 to the motor icon 62 with the magnitude of $P_{m2a}$. At step 144, a display signal is generated to display the power flowing from the motor icon 62 to the drive wheels icon 66 with the magnitude of $P_{m2a}$. The VSC/PCM 40, the display unit 56, or a combination of both can generate the display signal for the display unit 56 to display the $P_{m2a}$ indicator 68.

With reference to FIG. 13, flowchart diagram 146 illustrates steps of a method to perform step 104 of FIG. 9 and step 94 corresponding to the power flow between the engine 14 and the drive wheels 18.

At decision block 148, whether the gear shift selection is either park or neutral is determined. If the gear shift selection is neither park nor neutral, then step 150 occurs. Conversely, if the gear shift selection is either park or neutral, then step 152 occurs.

At steps 150 and 152, the power flow between the engine 14 and the drive wheels 18 ($P_{e2a}$) is calculated. Step 150 calculates power flow $P_{e2a}$ as the negative product of the ring gear torque ($\tau_{gen}/k_1$) and the ring gear speed ($\omega_{mot}*k_2$) where $k_1$ and $k_2$ are respective gear ratios. Step 152 determines or calculates power flow $P_{e2a}$ as zero or near zero. The VSC/PCM 40, the display unit 56, or a combination of both can perform steps 150 and 152.

At decision block 154, the sign of power flow $P_{e2a}$ is determined. The VSC/PCM 40, the display unit 56, or a combination of both can determine the sign of power flow $P_{e2a}$ based on whether the power flow $P_{e2a}$ is greater than or equal to zero. If power flow $P_{e2a}$ is less than zero, the step 156 occurs. Conversely, if power flow $P_{e2a}$ is greater than or equal to zero, then step 158 occurs. At step 156, a display signal is generated to display the power flowing from the drive wheels icon 66 to the engine icon 60 with the magnitude of $P_{e2a}$. At step 158, a display signal is generated to display the power flowing from the engine icon 60 to the drive wheels icon 66 with the magnitude of $P_{e2a}$. The VSC/PCM 40, the display unit 56, or a combination of both can generate the display signal for the display unit 56 to display the $P_{e2a}$ indicator 74.

With reference to FIG. 14, flowchart diagram 160 illustrates steps of a method to perform step 106 of FIG. 9 and step 94 corresponding to the power flow between the engine 14 and the electric machine arrangement (i.e., the electric motor 26 and/or the electric generator 24).

At decision block 162, whether the powertrain operation mode is in a negative split mode is determined. If the operation mode is not in a negative split mode, then step 164 occurs. However, if the operation mode is in a negative split mode, then step 166 occurs.

At steps 164 and 166, the power flow between the engine 14 and the electric machine arrangement ($P_{e2m}$) is calculated for displaying the power flow between the engine icon 60 and the motor icon 62. Step 164 calculates power flow $P_{e2m}$ as the product of generator torque $\tau_{gen}$ and generator speed $\omega_{gen}$. At step 164, power flow $P_{e2m}$ may be referred to as generator mechanical power. Step 166 calculates power flow $P_{e2m}$ as the product of motor torque $\tau_{mot}$ and motor speed $\omega_{mot}$. At step 166, power flow $P_{e2m}$ may be referred to as motor mechanical power. The VSC/PCM 40, the display unit 56, or a combination of both can perform steps 164 and 166.

At decision block 168, the sign of power flow $P_{e2m}$ is determined. The VSC/PCM 40, the display unit 56, or a combination of both can determine the sign of power flow $P_{e2m}$ based on whether the power flow $P_{e2m}$ is less than zero. If power flow $P_{e2m}$ is not less than zero, the step 170 occurs. Conversely, if power flow $P_{e2m}$ is less than zero, then step 172 occurs. At step 170, a display signal is generated to display the power flowing from the motor icon 62 to the engine icon 60 with the magnitude of $P_{e2m}$. At step 172, a display signal is generated to display the power flowing from the engine icon 60 to the motor icon 62 with the magnitude of $P_{e2m}$. The VSC/PCM 40, the display unit 56, or a combination of both can generate the display signal for the display unit 56 to display the $P_{e2m}$ indicator 72.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method of displaying component icons and a graphical representation of power flows between pairs of the component icons in a hybrid vehicle, the component icons representing components of the hybrid vehicle including an engine, a battery, drive wheels, and an electric machine arrangement having an electric motor and an electric generator, the method comprising:
    determining a mode of operation of the hybrid vehicle;
    processing powertrain signals to obtain a torque value and a speed value based on the mode of operation, the torque and speed values representing respective torque and speed of at least one of the electric motor and the electric generator;
    calculating magnitude and direction of power flow between the electric machine arrangement and at least one of the engine and the drive wheels based on the torque and speed values; and
    displaying the component icons and a graphical representation of the power flow, wherein the graphical representation is between at least one pair of the component icons and represents the magnitude and the direction of the power flow.

2. The method of claim 1 wherein the determining the mode of operation is based on whether the hybrid vehicle is operating in a negative split mode.

3. The method of claim 1 wherein the torque and speed values represent respective torque and speed of the electric motor when the mode of operation of the hybrid vehicle indicates a first mode, the torque and speed values representing respective torque and speed of the electric generator when the mode of operation of the hybrid vehicle indicates a second mode.

4. The method of claim 3 wherein the first mode is a negative split mode of the hybrid vehicle and the second mode is a positive split mode of the hybrid vehicle.

5. The method of claim 3 wherein the first mode is a positive split mode of the hybrid vehicle and the second mode is a negative split mode of the hybrid vehicle.

6. The method of claim 1 wherein the power flow is between the electric machine arrangement and the engine, the magnitude of the power flow being calculated as a product of a motor torque level ($\tau_{mot}$) and a motor speed level ($\omega_{mot}$) when the mode of operation of the hybrid vehicle indicates a first mode, and the magnitude of the power flow being calculated as a product of a generator torque level ($\tau_{gen}$) and a generator speed level ($\omega_{gen}$) when the mode of operation of the hybrid vehicle indicates a second mode.

7. The method of claim 6 wherein the first mode is a negative split mode of the hybrid vehicle and the second mode is a positive split mode of the hybrid vehicle.

8. The method of claim 6 wherein the direction of the power flow between the machine arrangement and the engine and is determined based on whether the power flow is less than zero.

9. The method of claim 1 wherein the power flow is between the electric machine arrangement and the drive wheels, the magnitude of the power flow being calculated as a product of a generator torque level ($\tau_{gen}$) and a generator speed level ($\omega_{gen}$) when the mode of operation of the hybrid vehicle indicates a first mode, and the magnitude of the power flow being calculated as a product of a motor torque level ($\tau_{mot}$) and a motor speed level ($\omega_{mot}$) when the mode of operation of the hybrid vehicle indicates a second mode.

10. The method of claim 9 wherein the first mode is a negative split mode of the hybrid vehicle and the second mode is a positive split mode of the hybrid vehicle.

11. The method of claim 9 wherein the direction of the power flow is between the machine arrangement and the drive wheels and is determined based on whether the power flow is greater than or equal to zero.

12. The method of claim 1 further comprising:
    processing the powertrain signals to obtain a battery power level ($P_{batt}$), a motor and generator power loss level ($P_{loss}$), and an auxiliary load power loss level ($P_{aux}$);
    determining magnitude and direction of power flow between the battery and the electric machine arrangement based on the battery power level ($P_{batt}$), the motor and generator power loss level ($P_{loss}$), and the auxiliary load power loss level ($P_{aux}$); and
    displaying a graphical representation of the power flow between the battery and the electric machine arrangement;
    wherein the graphical representation of the power flow between the battery and the electric machine arrangement is between at least one pair of the component icons and represents the magnitude and the direction of the power flow between the battery and the electric machine arrangement.

13. The method of claim 12 wherein the magnitude of the power flow between the battery and the electric machine arrangement is calculated as a difference between the battery power level ($P_{batt}$) and the sum of both the auxiliary load power loss level ($P_{aux}$) and the motor and generator power loss level ($P_{loss}$).

14. A system for displaying component icons and a graphical representation of power flows between pairs of the component icons in a hybrid vehicle, the component icons representing components of the hybrid vehicle including an engine, a battery, drive wheels, and an electric machine arrangement having an electric motor and an electric generator, the system comprising:
    a computer-readable storage medium;
    at least one controller in communication with the storage medium, the at least one controller being configured to determine a mode of operation of the hybrid vehicle;
    a signal processor configured to process powertrain signals to obtain torque data and speed data based on the mode of operation, the torque and speed data representing respective torque and speed of at least one of the electric motor and the electric generator;
    a data processor to calculate magnitude and direction of power flow between the electric machine arrangement and at least one of the engine and the drive wheels based on the torque and speed data,
    wherein the at least one controller controls a display unit to display the component icons and a graphical representation of the power flow, the graphical representation being between at least one pair of the component icons and representing the magnitude and the direction of the power flow.

15. The system of claim 14 wherein the mode of operation is based on whether the hybrid vehicle is operating in a negative split mode.

16. The system of claim 14 wherein the torque and speed data represent respective torque and speed of the electric motor when the mode of operation of the hybrid vehicle indicates a first mode, the torque and speed data representing respective torque and speed of the electric generator when the mode of operation of the hybrid vehicle indicates a second mode.

17. The system of claim 14 wherein the power flow is between the electric machine arrangement and the engine, the controller being configured to calculate the magnitude of the power flow as a product of a motor torque level ($\tau_{mot}$) and a motor speed level ($\omega_{mot}$) when the mode of operation of the hybrid vehicle indicates a first mode, and to calculate the magnitude of the power flow as a product of a generator torque level ($\tau_{gen}$), and a generator speed level ($\omega_{gen}$) when the mode of operation of the hybrid vehicle indicates a second mode.

18. The system of claim 14 wherein the power flow is between the electric machine arrangement and the drive wheels, the controller being configured to calculate the magnitude of the power flow as a product of a generator torque level ($\tau_{gen}$) and a generator speed level ($\omega_{gen}$) when the mode of operation of the hybrid vehicle indicates a first mode, and to calculate the magnitude of the power flow as a product of a motor torque level ($\tau_{mot}$) and a motor speed level ($\omega_{mot}$) when the mode of operation of the hybrid vehicle indicates a second mode.

19. The system of claim 14 wherein the controller is further configured to obtain a battery power level ($P_{batt}$), a motor and generator power loss level ($P_{loss}$), and an auxiliary load power loss level ($P_{aux}$) as well as to determine magnitude and direction of power flow between the battery and the electric machine arrangement based on the battery power level ($P_{batt}$), the motor and generator power loss level ($P_{loss}$), and the auxiliary load power loss level ($P_{aux}$), the display unit displaying a graphical representation of the power flow between the battery and the electric machine arrangement, wherein the graphical representation of the power flow between the battery and the electric machine arrangement is between at least one pair of the component icons and represents the magnitude and the direction of the power flow between the battery and the electric machine arrangement.

20. At least one non-transitory processor-readable storage medium having processor-readable code embodied thereon for programming at least one processor to perform a method of displaying component icons and a graphical representation of power flows between pairs of the component icons in a hybrid vehicle, the component icons representing components of the hybrid vehicle including an engine, a battery, drive wheels, and an electric machine arrangement having an electric motor and an electric generator, the method comprising:
   determining a mode of operation of the hybrid vehicle;
   processing powertrain signals to obtain a torque value and a speed value based on the mode of operation, the torque and speed values representing respective torque and speed of at least one of the electric motor and the electric generator;
   calculating magnitude and direction of power flow between the electric machine arrangement and at least one of the engine and the drive wheels based on the torque and speed values; and
   displaying the component icons and a graphical representation of the power flow, wherein the graphical representation is between at least one pair of the component icons and represents the magnitude and the direction of the power flow.

21. A method of displaying power flow in a hybrid vehicle comprising:
   displaying icons representing an engine, a battery, drive wheels and an electric machine having a motor and a generator;
   determining a mode of operation of the hybrid vehicle;
   obtaining a torque value and a speed value based on the mode of operation, the torque and speed values representing respective torque and speed of at least one of the motor and the generator;
   calculating magnitude and direction of power flow between the electric machine and the battery based on the torque and speed values associated with the electric machine, a battery power level and an auxiliary load loss level; and
   displaying a graphical representation of power flow between the icons representing the battery and the electric machine, wherein the graphical representation represents the magnitude and the direction of the power flow.

22. The method of claim 21 wherein the magnitude of the power flow between the battery and the electric machine is calculated as a difference between the battery power level and the sum of both the auxiliary load loss level and a motor and generator power loss level, and wherein the motor and generator power loss level corresponds to the torque and speed values associated with the motor and the generator.

23. The method of claim 21 further comprising:
   displaying a graphical representation of power flow between at least one pair of the icons, the power flow having a magnitude and direction based on torque and speed values associated with the electric machine and an operating mode of the hybrid vehicle.

24. The method of claim 23 wherein the torque and speed values represent respective torque and speed of the motor when the operating mode of the hybrid vehicle indicates a first mode, the torque and speed values representing respective torque and speed of the generator when the operating mode of the hybrid vehicle indicates a second mode.

25. The method of claim 24 wherein the power flow is between the electric machine and the engine, the magnitude of the power flow being calculated as a product of a motor torque level ($\tau_{mot}$) and a motor speed level ($\omega_{mot}$) when the operating mode of the hybrid vehicle indicates a negative split mode, and the magnitude of the power flow being calculated as a product of a generator torque level ($\tau_{gen}$) and a generator speed level ($\omega_{gen}$) when the operating mode of the hybrid vehicle indicates a positive split mode.

26. The method of claim 24 wherein the power flow is between the electric machine and the drive wheels, the magnitude of the power flow being calculated as a product of a generator torque level ($\tau_{gen}$) and a generator speed level ($\omega_{gen}$) when the operating mode of the hybrid vehicle indicates a negative split mode and the magnitude of the power flow being calculated as a product of a motor torque level ($\tau_{mot}$) and a motor speed level ($\omega_{mot}$) when the operating mode of the hybrid vehicle indicates a positive split mode.

27. The method of claim 21 wherein the direction of the power flow is determined based on whether the power flow is greater than or equal to zero.

\* \* \* \* \*